April 17, 1928.
J. F. CULLEN
1,666,234
MANUFACTURE OF CUSHION TIRED WHEELS
Filed June 26, 1923   2 Sheets-Sheet 1
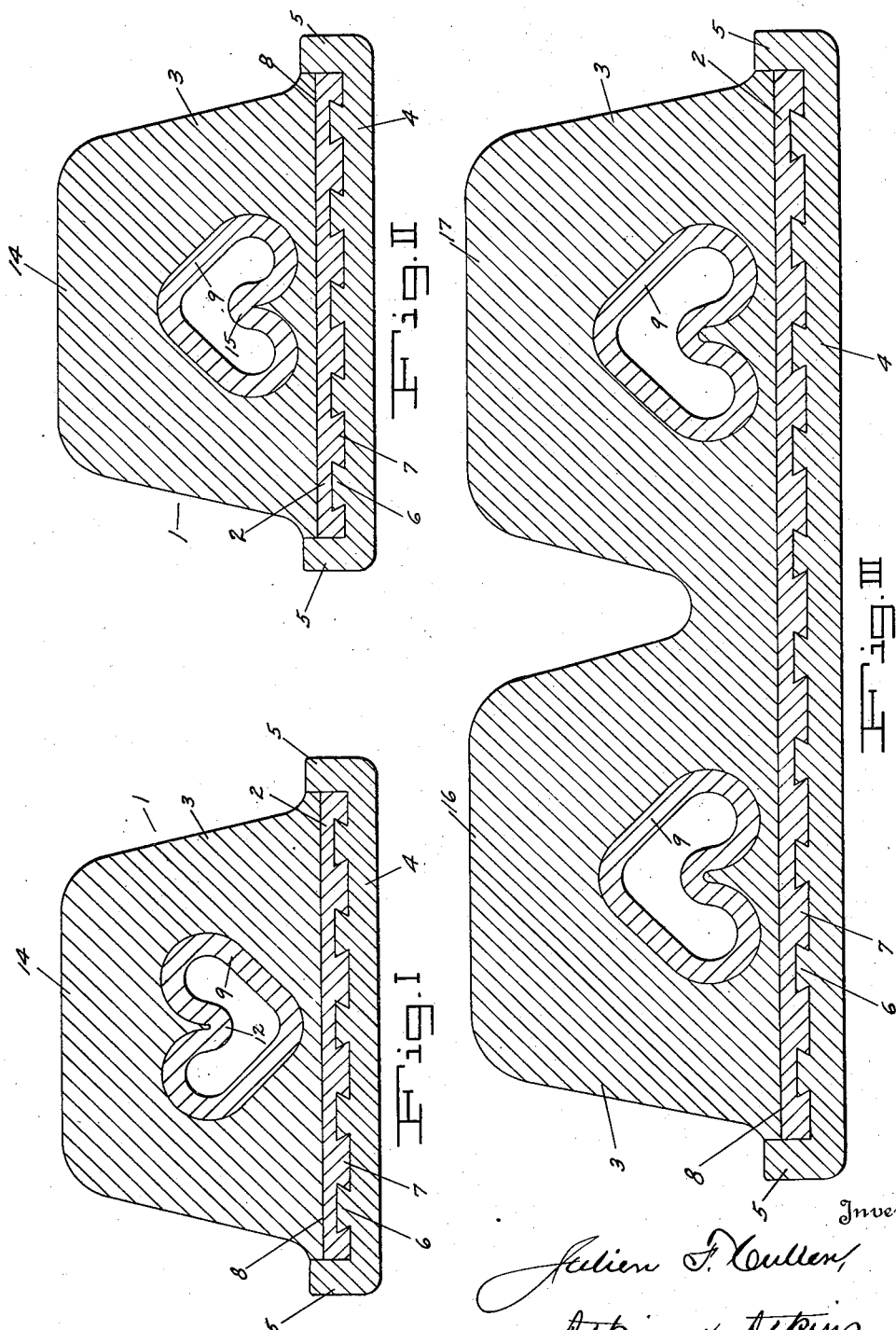

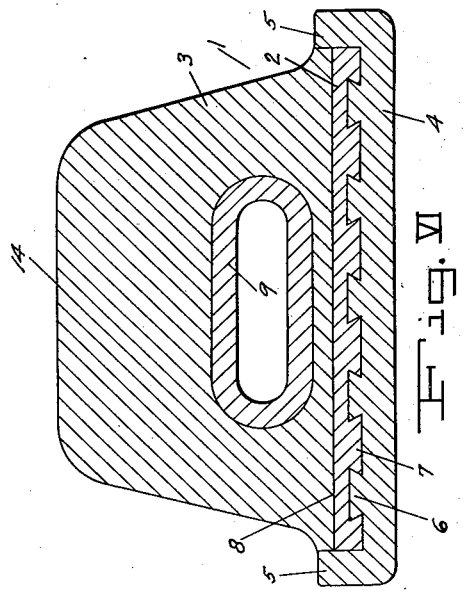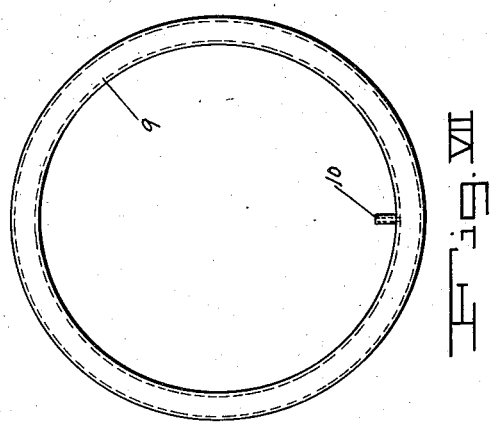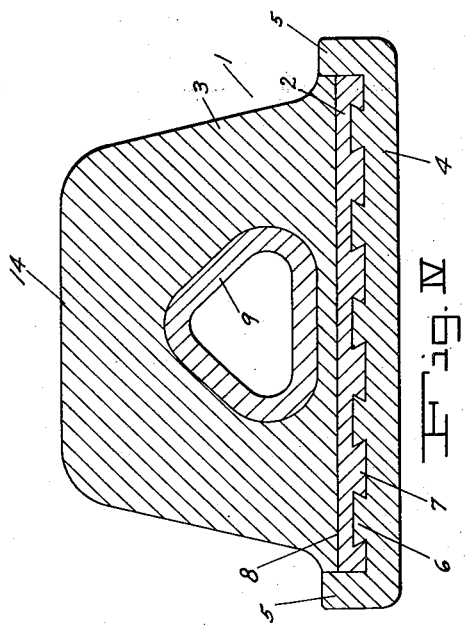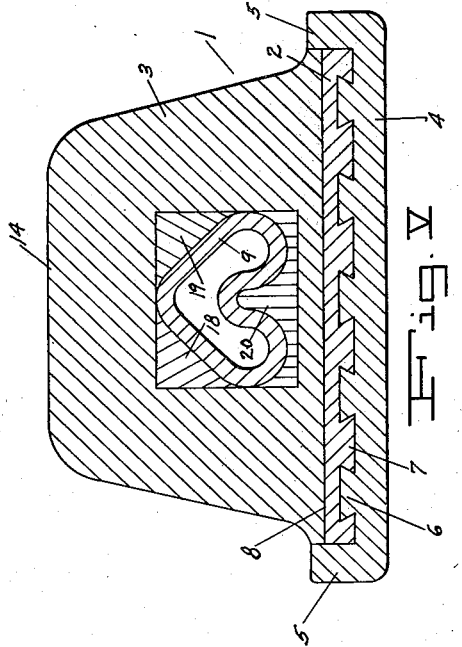

Patented Apr. 17, 1928.

1,666,234

UNITED STATES PATENT OFFICE.

JULIEN F. CULLEN, OF PORTLAND, OREGON.

MANUFACTURE OF CUSHION-TIRED WHEELS.

Application filed June 26, 1923. Serial No. 647,822.

My invention relates to cushion tires of the class generally known as solid tires, the same being such, for example only, as are particularly suitable for use on auto-trucks, and which, as contradistinguished from the pneumatic tire class, are made of solid rubber or other elastic material of that nature that is especially adapted for carrying heavy loads.

The main object of my invention is to produce a tire of the kind above indicated in which the characteristic load-sustaining capacity and resistance to wear of the tire are preserved, in combination with means embodied in its structural formation for increasing the effective elasticity of the tire in service.

The said object is attained broadly by incorporating an annular and preferably airtight closed chamber within the body of the tire and concentric therewith. A tire having such a chamber, which may in use hold compressible fluid, preferably air confined within it, is definitely distinguished from pneumatic tires in that it does not demand inflation as a condition precedent to its service, but is well adapted to operate under atmospheric pressure, confined or even unconfined in the chamber, despite the fact that compression of air confined in the chamber may be, if desired, employed to increase the stiffness of the resiliency of the tire as a whole.

The method and means preferably employed for accomplishing the end proposed and effected are described in the following specification, wherein what constitutes my invention is explained in detail and is succinctly set forth in the appended claims.

In the accompanying drawings,

Figures I to VI inclusive, are diametrical sections, respectively, of my tire in different forms of embodiment of my invention shown as varied only in respect to the cross-sectional shape of the chamber-defining member and are incorporated in the body of the tire.

Figure VII is a substantially diagrammatic illustration in side elevation of one of my chamber-defining members, detached.

Referring to the drawings, the numerals 1 to 9, inclusive are applied in each figure thereof except the last. 1 indicates a wheel rim, 2 a tire base, and 3 a tire, all of which may be of any suitable type, outward form, and mode of assemblement, such as are usual or may be preferred.

As shown in the drawings, the rim 1 is made of metal, and includes a felly 4, and lateral flanges 5. The felly tread defined between the flanges 5 is provided with a series of integral peripheral annuli 6 which are dovetailed in cross-section, and are defined by and disposed in parallel relationship with the side walls of intermediate channels depressed, in effect, below the surface of the said tread. Said channels are filled with a suitable vulcanizable material, usually hard rubber, which encircles the felly tread to form, in parallel relationship thereto, what is known in the art as a base, already indicated by the numeral 2. The base is securely anchored in the rim by means of complementary annuli 7, that are molded into the channels between the dovetailed annuli 6 to which the substance of the annuli 7 is made adherent. The outer periphery of the base presents a face 8 to which is securely united, preferably by vulcanization, the tire 3, which is made of any elastic material suitable for the purpose. The material commonly used in the tire is india rubber or some composition or compound thereof, or one having a vulcanizable substance for a component element.

The elements so far as specified hitherto being of any usual or preferred kind combined in any preferred manner, as already stated, it is next in order to specify what constitutes my invention. Broadly stated it consists, in respect to the process and product, in means for providing within the body of the tire 3 an annular chamber preferably defined by a hollow chamber-defining member 9, which is designed and adapted, as by vulcanization, to be permanently incorporated within the body of the tire 3, and with the material of which the tire is made.

It is a practical necessity in the manufacture of solid tires generally to fashion the tire of uniform symmetrical shape in crosssection in order to provide throughout its peripheral extent substantial uniformity of resistance to compression under the load imposed upon it. To accomplish that result in respect to my present invention, I employ in the manufacture of my tire the chamber-defining member 9 which is, in effect, an annular bag, and pack it with a removable filler which will, so long as it is confined therein, constitute said member into a molding core having substantial solidity and uniformity of shape throughout. The member 9 is preferably made either in whole or in part of heavy india rubber, its proportionate thickness being indicated in the drawings, which, in respect to proportions, are made substantially to scale.

The material used for the removable filler referred to is preferably a liquid, for example water, which, being practically non-compressible, and being, in my process of manufacture of the tire, entirely occluded within the member 9, is well suited for the purpose of imparting to said member the requisite quality of a core as that term is used in the art of molding. But, in place of a liquid filler, a granular mass of loose material like fine sand, for example, might be used with good results, the advantage in favor of the liquid being by reason of the facility with which it may be, as through any suitable filler vent 10, supplied to and withdrawn from the interior of the member 9.

After the member 9 is made and filled, for example, substantially as above described, it is employed, in any suitable manner or method of tire manufacture that may be usual or preferred, as a core for the molding of the tire 3. To that end, a rim 1 provided with a base 2 is made ready for the application of the tire 3, and a selected member 9 of proper dimensions is presented thereto in required disposition about the base-encircled rim. Then the tire material is applied and formed as by molding it into the desired shape upon the base around the rim and also about the member 9. After the baking step of the vulcanizing process is accomplished and the union of the parts 1, 2, 3, and 9 thereby perfected, the product is removed from the oven and is ready for the application of the usual finishing process.

A final step in the completion of my tire consists in the removal of the filler from the interior of the member 9 with the effect of converting said member from a molding to a chamber-defining member. After removal of the filler through the vent 10 and the conversion of the member 9 thereby effected, the vent is preferably closed by permanent ensealment, prior whereto the air which takes the place of the filler within the chamber defined by the member 9 may be upon occasion subjected to compression if desired. Compression to any degree is, as already specified optional, and it or even confinement of the air in said chamber may be either omitted or employed according to the dictation of sound discretion. It is non-essential and of minor importance at the most.

It should be understood that in the completed article, the member 9 becomes incorporated with and made an integral portion of the tire through the operation of the process of vulcanization upon the constituent elements of the parts of the tire subject to vulcanization. The member 9, being preferably made either wholly or at least in part of clear india rubber, that is to say of india rubber without substantial modification or change, possesses resiliency of a high degree. This factor contributes in itself to the elasticity of the tire 3 which encases the member 9, the later constituting, in effect, a hollow annular supporting arch to the tire; but the resilient strength of the member 9 may be materially augmented by the occlusion of a volume of air within the member 9, so as to constitute an air cushion support against the base for the outer walls of the tire.

The incorporation of a chamber-defining member within the body of a tire so that the latter surrounds the former on all sides affords at the same time not only provision of a chamber within the tire, but also provision of means for vulcanizing a tire to an unbroken hard rubber base and its rim, in accordance with the accepted method of manufacturing solid tires. Such provision distinguishes my invention both in form and substance from that existing type of chambered tire in which a peripheral slot in the rim and base is necessary to the manufacture of a chambered solid tire.

It has been in the description of Figures I to VI indicated that the shape in cross-section of the chamber-defining member 9 is subject at will to variation from a simple tube to an indefinite extent. The simple tubular form may serve in some instances the purpose of the member 9, but variation is desirable for distributing laterally resistance to compression strains upon the tire under different stresses of load and service in use. It is impossible to attempt to set forth the range of such variation; but a few different varieties of form are illustrated in the drawings. Therein, Figure I shows a member 9 of a generally triangular effect in cross section, but distinguished by a side wall having a reentrant angle 12, nearer the tread 14 of the tire. In Figure II a similar member 9 is shown with this variation that the reentrant angle, indicated in that figure by the numeral 15, is located in that portion of the tire that is nearer to the base 2. Figure III shows a duplication in one tire having two treads 16 and 17 of the form of embodiment shown in Figure II. Figure IV shows a member 9 shaped in cross-section substantially in the form of an equilateral triangle. Figure VI shows in effect a transversely elongated member 9.

The subject matter of Figure V is substantially a duplication of Figure II with the addition of one variation which is equally applicable to any of the different forms of the member 9 and constitutes a desirable expedient in the ordinary process of manufacture. The said variation consists in providing supporting strips 18, 19, and 20, which, being preferably made, respectively, of the same kind of material substantially as that from which the tire is made, are employed to increase, in effect, the mass of the side walls of the member 9, and to impart upon their application to the outside of said member a rectangular contour. In making tires embodying the application of supporting strips, the member 9 is juxtaposed to the sides of the strips aforesaid, and is united thereto into a single structure, by vulcanization for example, which affects union of the strips to the outer transverse periphery of the member 9, and union also between the outside of the strips and the circumjacent material of the tire 3.

It is contemplated that in the manufacture of my invention occasion may arise for imparting to the member 9, before its assemblement with its companion members, a preparatory semi-curing treatment or slight degree of vulcanization, but this is one of many variable details of manufacture to which my invention is in no wise restricted. Nevertheless, a preparatory treatment of the chamber-defining member 9, either in its simple form or that shown in Figure V, has one important and distinctive advantage, namely, that it affords in the manufacture of a solid tire dependable means of homogenizing under vulcanization the entire mass of material throughout the body of the tire. This effect is accomplished in consequence of the fact that the member 9 in its final baking occupies the middle portion of the tire material, that is to say, the portion which is least accessible to the effective heat of the oven. Consequently a preparatory partial vulcanization of the member 9 renders the said inaccessible portions amenable to a somewhat lower degree of heat than what would be, without the presence of the previously treated member 9, required for effecting complete and final vulcanization.

What I claim is:

1. The process of making "solid" cushion tires which comprises only partially vulcanizing a resilient tubular core body sufficiently to retain a filler, incorporating a relatively non-compressible filler in said body, incorporating the body within a solid rubber body on a one piece metallic rim and enclosing the same within said body and the rim, vulcanizing the core and tire body to a point sufficient to create a unitary homogeneous structure with the core vulcanized to the wall of the solid rubber body and without destroying the resiliency of the core, and finally removing the filler.

2. The process of making "solid" cushion tires which comprises only partially vulcanizing a resilient tubular core body sufficiently to retain a filler, incorporating a relatively non-compressible filler in said body on a one piece metallic rim and enclosing the same on the rim, vulcanizing the core and tire body to a point sufficient to create a unitary homogeneous structure with the core vulcanized to the wall of the solid rubber body and without destroying the resiliency of the core, and removing said filler from the core body through said rim.

3. The process of making "solid" cushion tires which comprises partially vulcanizing a resilient relatively thick tubular bag sufficiently to retain a filler within the same, incorporating a relatively non-compressible filler in said core on a one piece metallic rim, molding vulcanizable tire material upon the rim and around the core to form a tire structure entirely enclosing the bag, vulcanizing the core and tire material to a point sufficient to unite the parts into a homogeneous structure but insufficient to destroy the resiliency of the core, and removing the filler in its original form through said rim.

4. The process of making solid cushion tires of the type consisting of vulcanizable rubber composition and having an internal cavity which consists in mounting a resilient partially vulcanized bag containing core material which is substantially non-compressible on a metallic rim, applying vulcanizable rubber composition to the rim around the bag, vulcanizing the assemblage and rendering the bag and remainder of the tire outside the same a unitary homogeneous structure with the bag vulcanized to the inner wall of the tire, and finally removing the material in its original form from said bag through the rim.

5. A process for making solid cushion tires of the type comprising an internal cavity surrounded by rubber composition which consists in mounting upon a one-piece rim a partially vulcanized resilient bag containing a substantially incompressible material to form a core, enclosing said bag within rubber composition upon the rim, vulcanizing the entire assemblage of bag and composition into a homogeneous unit in a mould, and finally removing the material from said bag through the rim in its original form.

In testimony whereof, I have hereunto set my hand.

JULIEN F. CULLEN.